(12) United States Patent
Iannucci

(10) Patent No.: US 8,186,631 B2
(45) Date of Patent: May 29, 2012

(54) AEROFOIL MEMBER

(75) Inventor: Lorenzo Iannucci, Dorking (GB)

(73) Assignee: Imperial Innovations Limited, London (GB)

(*) Notice: Subject to any disclaimer, the term of this patent is extended or adjusted under 35 U.S.C. 154(b) by 316 days.

(21) Appl. No.: 12/480,223

(22) Filed: Jun. 8, 2009

(65) Prior Publication Data

US 2009/0308124 A1   Dec. 17, 2009

Related U.S. Application Data

(63) Continuation of application No. PCT/GB2007/004629, filed on Dec. 4, 2007.

(30) Foreign Application Priority Data

Dec. 8, 2006   (GB) .................................. 0624580.7

(51) Int. Cl.
*B64C 3/52* (2006.01)
*B64C 3/48* (2006.01)
*H01L 41/09* (2006.01)

(52) U.S. Cl. ..... 244/219; 244/201; 244/215; 244/123.1; 244/123.6

(58) Field of Classification Search .................. 244/201, 244/211, 212, 213, 214, 215, 219, 123.1, 244/123.6
See application file for complete search history.

(56) References Cited

U.S. PATENT DOCUMENTS

| | | | | |
|---|---|---|---|---|
| 2,152,029 A * | 3/1939 | Cone | ............................ | 244/215 |
| 3,109,613 A * | 11/1963 | Bryant et al. | .................. | 244/219 |
| 3,801,044 A * | 4/1974 | Moore | ................................ | 244/5 |
| 4,341,176 A * | 7/1982 | Orrison | .................... | 114/102.22 |
| 5,869,189 A * | 2/1999 | Hagood et al. | ................. | 428/461 |
| 5,887,828 A * | 3/1999 | Appa | ............................ | 244/215 |
| 5,891,577 A | 4/1999 | Breitbach et al. | | |
| 6,010,098 A * | 1/2000 | Campanile et al. | ........... | 244/219 |
| 6,015,115 A | 1/2000 | Dorsett | | |
| 6,152,405 A * | 11/2000 | Muller | ......................... | 244/219 |
| 6,173,925 B1 * | 1/2001 | Mueller et al. | ................. | 244/219 |
| 6,199,796 B1 * | 3/2001 | Reinhard et al. | ............ | 244/35 R |
| 6,276,641 B1 * | 8/2001 | Gruenewald et al. | ......... | 244/213 |
| 6,375,127 B1 * | 4/2002 | Appa | ........................... | 244/215 |
| 6,644,599 B2 * | 11/2003 | Perez | ............................. | 244/219 |
| 7,055,782 B2 * | 6/2006 | Dittrich | ........................ | 244/219 |
| 7,384,016 B2 * | 6/2008 | Kota et al. | ................... | 244/123.1 |
| 7,669,799 B2 * | 3/2010 | Elzey et al. | .............. | 244/123.12 |
| 7,896,294 B2 * | 3/2011 | Dittrich | ........................ | 244/219 |
| 7,918,421 B2 * | 4/2011 | Voglsinger et al. | ........... | 244/219 |
| 2003/0201363 A1 * | 10/2003 | Carr | ................................ | 244/74 |
| 2005/0029406 A1 | 2/2005 | Dittrich | | |
| 2006/0102798 A1 * | 5/2006 | Cox et al. | ...................... | 244/190 |
| 2006/0145031 A1 * | 7/2006 | Ishikawa et al. | .............. | 244/219 |
| 2006/0157623 A1 * | 7/2006 | Voglsinger et al. | ........... | 244/219 |
| 2006/0186269 A1 * | 8/2006 | Kota et al. | ................... | 244/123.1 |
| 2007/0164147 A1 | 7/2007 | Carr et al. | | |

* cited by examiner

*Primary Examiner* — Timothy D Collins
*Assistant Examiner* — Joseph W Sanderson
(74) *Attorney, Agent, or Firm* — Cooper Legal Group LLC

(57) ABSTRACT

An aerofoil member is described which provides for a 'smart Core' and flexible skin. The core comprises sheet material elements forming adjoining cells. The length of the elements can be changed, for example, using the piezo-electric effect, to alter the cross-sectional shape of the aerofoil without changing the peripheral length. Thus, the shape of the aerofoil may be changed to suit different flight conditions, or to mimic the effect of control surfaces.

16 Claims, 2 Drawing Sheets

AEROFOIL MEMBER

RELATED APPLICATION(S)

This application is a continuation of PCT/GB2007/004629 filed Dec. 4, 2007, which claims benefit of United Kingdom application no. 0624580.7, filed Dec. 8, 2006, the entirety of which are hereby incorporated by reference herein.

BACKGROUND

Aerofoil members are used in fluid dynamic applications such as wings for aeroplanes, watercraft, flying wings, unmanned aerial vehicles (UAVs), and fins for projectiles.

It is desirable to be able to change the profile shape of an aerofoil in order to effect control of aerodynamic forces, for example to control the movements of a vehicle, and also in order to adjust the aerodynamic forces to suit different conditions (for example at different speeds). This is conveniently achieved with movable surfaces such as ailerons, flaps and airbrakes. However the effect of these on the characteristics of the aerofoil is limited by the fact that they change only a small part of the aerofoil shape.

The use of an adaptive structure able to change the shape of an aerofoil member, for example a "morphing wing", has the potential to reduce the system complexity by eliminating control surfaces and their associated equipment. It also has the potential to allow a flying body such as a UAV to adapt to the varying conditions experienced during flight by providing an optimal aerofoil sectional shape over a range of speeds, for example transonic flight.

Prior attempts to eliminate control surfaces have focused on attempting to bend the outer surface or skin of the aerofoil. For example, bending the skin downwardly along the trailing edge of a wing might mimic an aileron effect. A problem with this approach is that the elements used to affect the bending must be very stiff, so that in practice it is difficult to achieve a sufficiently large movement, and thus a sufficient control effect.

SUMMARY

According to the present disclosure there is provided an aerofoil member comprising a flexible outer skin supported by a core, the core comprising a plurality of sheet material elements, each element having an actuator which is actuable to adjust at least one dimension of the respective element, so as to adjust the cross sectional shape of the aerofoil.

Thus the disclosure provides a "smart core", which supports the skin of the aerofoil member and can change shape. This gives strength and stability to the aerofoil in the shape which is required, and also potentially allows significant changes to the entire aerofoil shape. Thus the aerodynamic shape of the aerofoil may be modified on demand by use of the actuators, for example from a profile suited for low speed flight to one suitable for transonic flight. Preferably, the cross-sectional shape may be adjusted without substantially changing the peripheral length, such that the dimensions of the skin are kept constant.

Preferably the elements are joined together to form adjoining cells of adjustable size and/or shape, for example in a 'honeycomb' structure. Such a structure provides good compressive strength characteristics necessary to deal with the aerodynamic load experienced in use. The elements at the periphery of the core may be pivotally joined to the skin at an edge thereof. Thus the skin may be supported at a plurality of closely spaced positions around the periphery of the aerofoil in order to provide a smooth profile.

The elements may be formed of piezo-electric material, and the actuators may thus be electrodes formed on the material, for example by inkjet printing. Alternatively the elements may be magnetostrictive materials and the actuators may comprise means for applying magnetic fields. As a further alternative, actuation may be achieved through the application of temperature changes or electrostatic charge, and the elements may comprise materials such as shape memory alloys, shape member polymers, and monolithic single crystal piezo based composites.

The flexible skin may comprise a composite material such as polyurethane re-enforced with glass or carbon fibres. The skin is advantageously arranged such that at least one commonly required aerofoil shape may correspond to a natural mode of the skin material. The 'hinges' between the element and the skin are suitably formed of polypropylene.

Where the elements comprise piezo-electric material, they may for example be fabricated from a plurality of layers of laminated piezo-ceramic material. This allows for the use of the "Poisson's effect" to increase the maximum strain or dimensional change achievable for each element.

The disclosure also provides a method of changing the cross-sectional shape of such an aerofoil.

DESCRIPTION OF THE DRAWINGS

In order that the disclosure may be more readily understood, reference will now be made, by way of example, to the accompanying drawings, in which.

DETAILED DESCRIPTION

Figure 1:
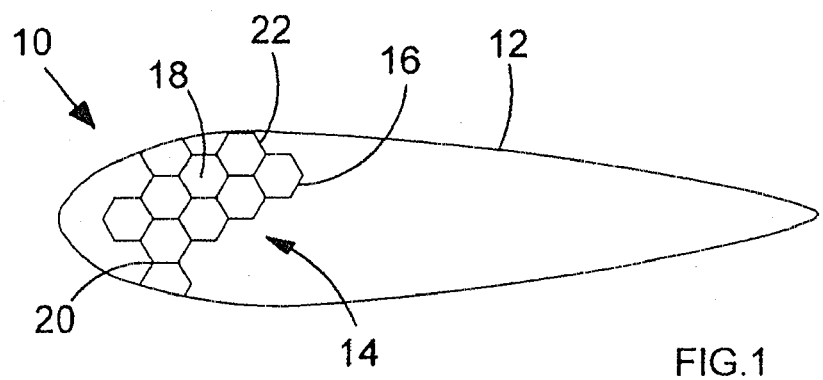
FIG. 1 is a chord-wise cross sectional view of an aerofoil member such as a wing.

Referring to FIG. 1, the aerofoil 10 comprises an outer skin 12 and a core 14 (shown partly broken). The core 14 comprises a three dimensional honeycomb structure formed of a plurality of sheet material elements 16. The elements 16 form adjoining cells 18 which are space-filling, for example dodecahedrons. They are joined along their edges 20 in a flexible manner, for example by being attached using a polyurethane material hinge. The peripheral elements, for example 22, are joined along their edges to the outer skin 12 and so in a flexible manner for example using polypropylene as a 'hinge'.

The elements 16 are formed of a piezo-electric material, and have actuators in the form of electrodes formed thereon. For example they may be piezo ceramic material with conductive polymer electrodes. The electrodes are arranged such that the application of an electric current to the electrodes causes a change in the length of the associated element. The skin is made of a flexible material which nevertheless retains its shape under aerodynamic loads; for example polyurethane re-enforced with glass or carbon fibres.

Figure 2:
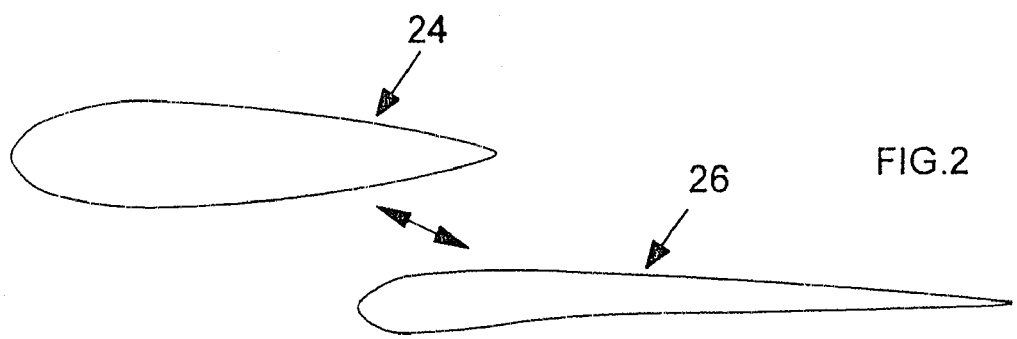
FIG. 2 shows two different cross sectional aerofoil shapes which may be achieved by the aerofoil of FIG. 1.

As shown in FIG. 2, the application of an electric current to the electrodes on the elements 16, the length of the elements 16 may be caused to expand or contract to adjust the thickness of the aerofoil. Thus starting from a symmetrical aerofoil, shortening the length of elements extending vertically in the figure, whilst lengthening the elements extending horizontally in the figure, can lead a thinner and longer aerofoil profile 26. Such a profile may for example be more suitable for higher speed flying conditions. The profiles both have the same peripheral length, such that the change in shape of the core 10 does not require the length of the skin 12 to change.

Figure 3:
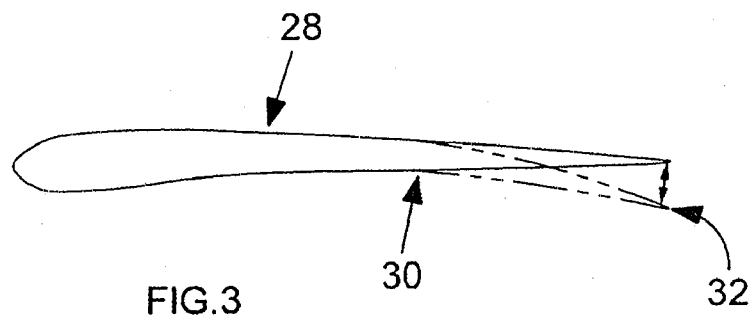
FIG. 3 shows a further cross sectional shape change which may be achieved with the aerofoil of FIG. 1.

Referring now to FIG. 3, an alternative shape change for an aerofoil 28 can be achieved by applying an electric current to the electrodes of the elements in the rear part 30 of the aerofoil 28 only. The shape of the cells 18 in this region may be changed in a manner such that the trailing edge 32 of the aerofoil 28 is caused to move downwardly, mimicking an aileron effect.

Figure 4:
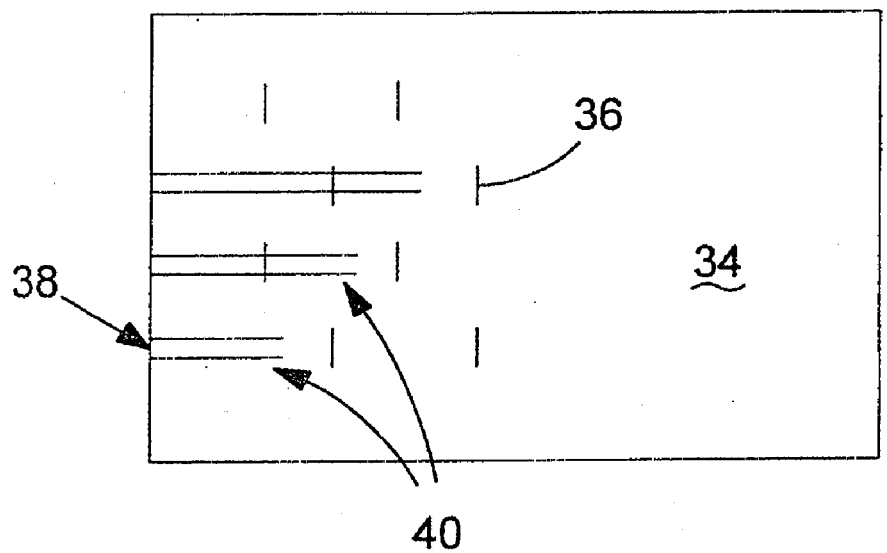
FIG. 4 is a top plan view of the elements forming the "smart core" suitable for use in an aerofoil member such as that of FIG. 1.

FIG. 4 shows an example of how the smart core may be produced. A plurality of layers 34 each comprise several sheets of ceramic material laminated together. These layers are placed on top of one another. The layers may be bonded together at appropriate positions 36 such that, on moving the top layer away from the bottom layer, a honeycomb structure is formed. Pairs of electrodes 38 may be printed onto each layer 34 to control each part of the film which will form a single element 40. Each pair of electrodes 38 leads to the processor of a computer control system for controlling the electric current.

Figure 5:
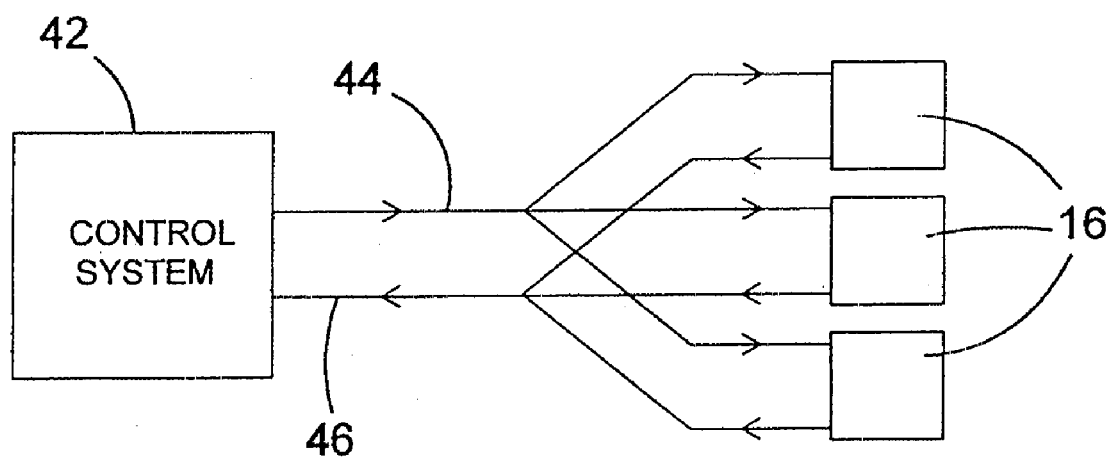
FIG. 5 is a schematic diagram of the control process for an aerofoil such as provided herein.

Referring to FIG. 5, a computer control system 42 is arranged such that actuation or control signals 44 in the form of electric current are sent to the electrodes of the elements 16. The control system also senses the length of each element 16 by monitoring the current signal 46 in the electrodes of each element 16. Thus the control system 42 controls the shape of the aerofoil.

What is claimed is:

1. An aerofoil member, comprising a flexible outer skin supported by an inner structural core, the core comprising a plurality of sheet material elements joined together to form a matrix of adjoining cells, at least one of the elements comprising an actuator actuable to adjust at least one of a size or shape of at least one of the elements and adjust a cross-sectional shape of the aerofoil member, at least one of the elements at a periphery of the core joined to the skin.

2. The aerofoil member of claim 1, at least one of the elements formed of piezo-electric material, the actuator comprising electrodes.

3. The aerofoil member of claim 1, the flexible skin comprising a composite material.

4. The aerofoil member of claim 1, the flexible skin comprising a polyurethane material reinforced with at least one of glass or carbon fibers.

5. The aerofoil member of claim 1, the skin arranged such that at least one predetermined aerofoil shape corresponds to a default shape of the skin.

6. The aerofoil member of claim 1, at least one of the elements joined to the skin by a polypropylene material.

7. The aerofoil member of claim 1, at least one of the elements comprising one or more layers of laminated piezo-ceramic material.

8. A method of changing the cross-sectional shape of the aerofoil member of claim 1, comprising applying an actuator signal to the actuator to alter the cross-sectional shape without substantially changing a peripheral length of the aerofoil member.

9. The aerofoil member of claim 1, the matrix of adjoining cells comprising a three dimensional honeycomb structure.

10. The aerofoil member of claim 1, the actuator actuable based at least in part on a change in temperature.

11. The aerofoil member of claim 1, the matrix of adjoining cells comprising one or more dodecahedron structures.

12. A method for changing a cross-sectional shape of an aerofoil member, comprising:
    applying an electric current to one or more electrodes of an aerofoil member, the aerofoil member comprising an outer skin, and an inner core comprising a three dimensional honeycomb structure, the honeycomb structure comprising one or more sheet material elements joined together to form a matrix of adjoining cells, at least one of the sheet material elements comprising an actuator, the actuator comprising at least one of the electrodes, the applied electric current changing the cross-sectional shape such that a peripheral length of the aerofoil member is substantially unchanged.

13. The method of claim 12, comprising applying an electric current to electrodes corresponding to at least one of a top or bottom portion of the aerofoil member such that a shape of the aerofoil member changes to mimic an aileron.

14. The method of claim 12, comprising utilizing a control system to monitor the electric current applied.

15. The method of claim 12, comprising utilizing a control system to regulate the electric current applied.

16. The method of claim 12, at least one of the sheet material elements formed of piezo-electric materials.

* * * * *